United States Patent [19]

Silverbrook

[11] Patent Number: 5,590,252
[45] Date of Patent: Dec. 31, 1996

[54] VIDEO PROCESSOR SYSTEM AND AUDIO PROCESSOR SYSTEM

[75] Inventor: Kia Silverbrook, Woollahra, Australia

[73] Assignees: Canon Kabushiki Kaisha, Japan; Canon Information Systems Research Australia Pty Ltd., Australia

[21] Appl. No.: 53,569

[22] Filed: Apr. 28, 1993

[30] Foreign Application Priority Data

Apr. 29, 1992 [AU] Australia .................................. PL2141

[51] Int. Cl.$^6$ .................................................. G06F 15/00
[52] U.S. Cl. ........................................................ 395/133
[58] Field of Search ................................... 345/115, 116, 345/153, 150; 395/140, 141, 142, 143, 162, 133

[56] References Cited

U.S. PATENT DOCUMENTS

| | | | |
|---|---|---|---|
| 5,428,741 | 6/1995 | Ho et al. | 395/162 |
| 5,483,627 | 1/1996 | Silver Brook et al. | 395/133 |

FOREIGN PATENT DOCUMENTS

| | | |
|---|---|---|
| 0476993 | 3/1992 | European Pat. Off. . |
| 0490505 | 6/1992 | European Pat. Off. . |

OTHER PUBLICATIONS

"Creation And Animation Of Computer Generated Images Combined With A Camera And Smart Graphics Card", Mallem, et al., Microprocessors And Microsystems, vol. 15, No. 8, Oct. 1991, pp. 427–433.

"Automatic Curve Fitting With Quadratic B–Spline Functions And Its Applications To Computer Assisted Graphics And Image Processing", Yang, et al., Computer Vision, Graphics And Image Processing, vol. 33, No. 3, Mar. 1986, pp. 346–363.

*Primary Examiner*—Phu K. Nguyen
*Attorney, Agent, or Firm*—Fitzpatrick, Cella, Harper & Scinto

[57] ABSTRACT

An inexpensive audio and video processing system (1) for combining animated object images with live video (28) with the addition of a combined audio capability (12) is disclosed. The system (1) includes a video processor system comprising a real-time object (RTO) processor (10) for rendering object-based graphic images, a video input means (30,27) for receiving a first video signal (28), at least one colour mixing and generation device (13) arranged to combine said first video signal (28) with image data (24) rendered from the RTO processor (10) to provide a second video signal and a video output means (38) for outputing same.

27 Claims, 4 Drawing Sheets

VIDEO PROCESSOR SYSTEM AND AUDIO PROCESSOR SYSTEM

BACKGROUND

FIELD OF THE INVENTION

The present invention relates to an audio and video processor system and, in particular, discloses apparatus that combines animated graphic object images with live video in real-time with a combined audio processing capability.

DESCRIPTION OF THE RELATED ART

Computerized systems for the composition of video images exist in the art, however these systems normally involve the use of a high speed frame buffer, with the image being composed and then stored in the frame buffer memory device on a pixel by pixel basis before the image is mixed with a video signal to produce a final Video signal.

The need to use a frame buffer can add considerable expense to the overall computerized composition system, which generally places such systems out of the reach of normal consumer markets.

SUMMARY OF THE INVENTION

It is an object of the present invention to provide an efficient, inexpensive and effective computerized composition system.

In accordance with a first aspect of the present invention there is disclosed a video processor system comprising a real-time object (RTO) processor for rendering object-based graphic images, a video input means for receiving a first video signal, at least one colour mixing and generation device arranged to combine said first video signal with image data rendered from said RTO processor to provide a second video signal and a video output means for outputing same In accordance with another aspect of the present invention the present invention there is disclosed an audio and video processor system comprising a real-time object (RTO) processor for rendering object-based graphic images, a video input means for receiving a first video signal, at least one colour mixing and generation device arranged to combine said first video signal with image data rendered from said RTO processor to provide a second video signal and a video output means for outputing same, and control means with associated memory means for generating audio output signals in concert with said second video signal.

Preferably, the audio output signals are generated in substantial synchronism with visual events depicted within said second video signal.

BRIEF DESCRIPTION OF THE DRAWINGS

A preferred embodiment of the present invention will now be described with reference to the accompanying drawings in which.

DETAILED DESCRIPTION OF THE PREFERRED EMBODIMENT

The present invention is specific application of technology disclosed in:

U.S. patent application Ser. No. 08/053,373, filed Apr. 28, 1993, claiming priority from Australian Patent Application No. PL2147, filed Apr. 29, 1992, entitled "A Real-Time Object Based Graphics System";

U.S. patent application Ser. No. 08/053,212, filed Apr. 28, 1993, claiming priority from Australian Patent Application No. PL 2148, of Apr. 29, 1992 entitled "Method and Apparatus for Filling an Object Based Rasterised Image";

U.S. patent application Ser. No. 08/053,214, filed Apr. 28, 1993, claiming priority from Australian Patent Application No. PL 2153, filed Apr. 29, 1992, entitled "Method and Apparatus for Providing Transparency in an Object Based Rasterised Image";

U.S. patent application Ser. No. 08/053,365, filed Apr. 28, 1993, claiming priority from Australian Patent Application No. PL 2156, filed Apr. 29, 1992 entitled "Edge Calculation for Graphics Systems" and Australian Patent Application No. PL 2145, filed Apr. 29, 1992, entitled "Object Sorting for Graphics Systems";

U.S. patent application Ser. No. 08/053,378, filed Apr. 28, 1993, claiming priority from Australian Patent Application No. PL 2142, filed of Apr. 29, 1992 entitled: "A Preprocessing Pipeline for RTO Graphics System";

U.S. patent application Ser. No. 08/053,219, filed Apr. 28, 1993, claiming priority from Australian Patent Application No. PL 2150, filed Apr. 29, 1992 entitled "Object Based Graphics Using Quadratic Polynomial Fragments"; and U.S. patent application Ser. No. 08/053,213, filed Apr. 28, 1993, claiming priority from Australian Patent Application No. PL 2149, filed Apr. 29, 1992 entitled "Bezier Spline to Quadratic Polynomial Fragment Conversion";

all lodged by the present applicant, the disclosure of each of which is hereby incorporated by reference.

Figure 1A:
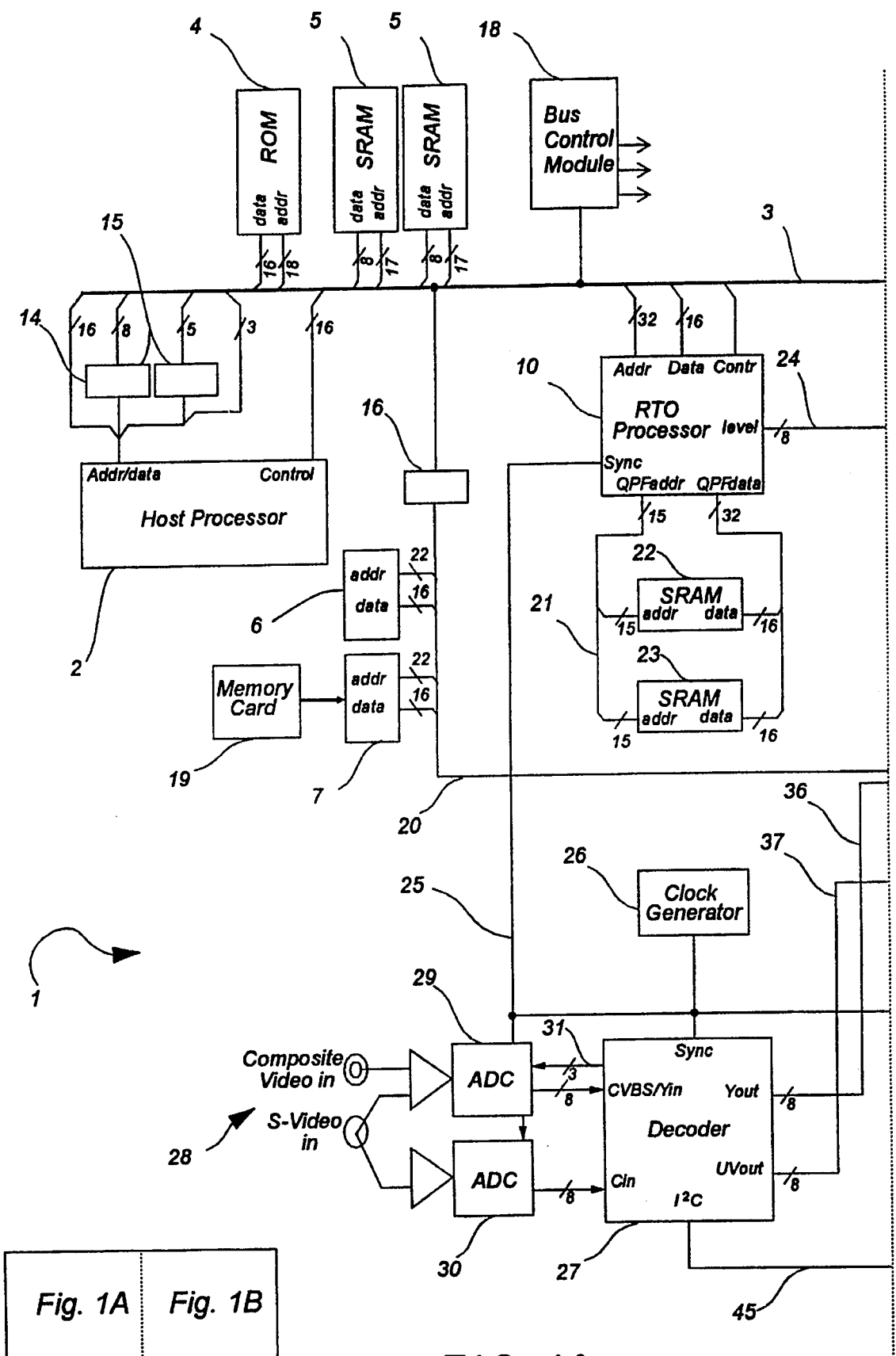
FIGS. 1A and 1B show a schematic block diagram of the overall structure of the audio and video processing system.
Figure 1B:
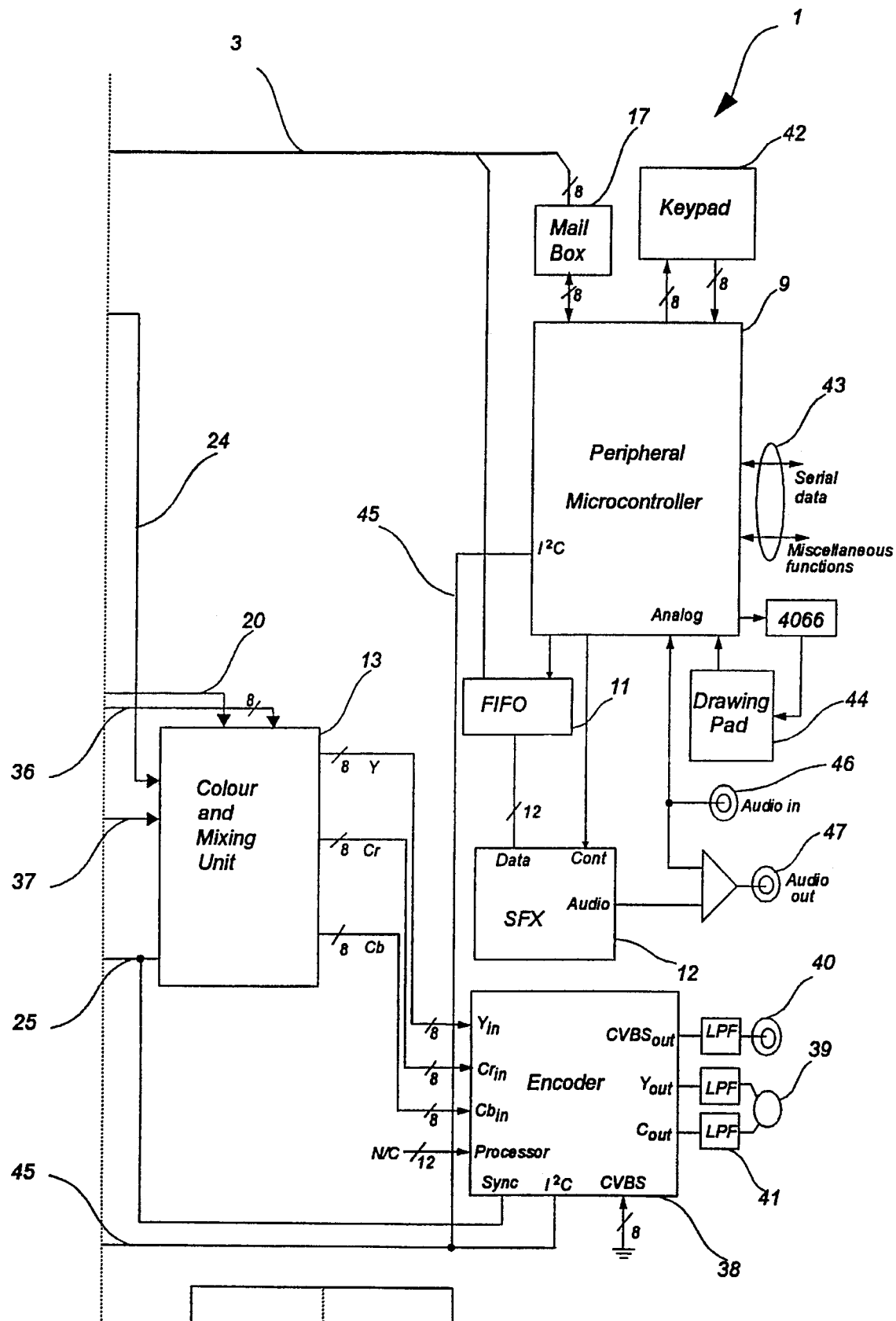

In FIGS. 1A and 1B, there is shown the preferred embodiment of the present invention in the form of video processing system 1 which includes a host processor 2 connected to a processor bus 3. Also connected to the processor bus 3 is a system ROM 4, a system RAM 5, a first memory card socket 6, a second memory card socket 7, a peripheral microcontroller 9, a RTO processor 10, a colour and mixing unit 13 and a sound effects device 12 which is connected via a FIFO queue 11.

The host processor 2 is a general purpose microprocessor which is arranged to control the generation of object based animated images. In the preferred embodiment, the host processor 2 is a 32 bit microprocessor such as the INTEL i360SA, which permits high speed operation at low cost and has a wide addressing range. The host processor 2 operates to create and maintain multiple object lists which are stored in the system RAM 5 and which include multiple objects which are ultimately processed the RTO processor 10 to form an animated image. The calculations are generally only performed at the graphics object level. For each video field, the host processor 2 specifies the position, size, aspect ratio and colour of each object that is to appear in the animated image. The host processor 2 also interacts with the peripheral microcontroller 9 to provide a graphical user interface for the user of the video processing system 1.

The host processor 2 has a 16-bit external data bus which is multiplexed with a 32 bit address bus. In addition, there are 16 control signals provided by the host processor 2. The most significant 16 address bits (bits 31-16) are not multiplexed. However address bits 15 to 4 are demultiplexed by address latches 15. The host processor 2 has secondary control of the processor bus 3 whilst the RTO processor 10 can obtain access to the bus 3 via DMA whenever it requires such access, except whenever specifically locked out via software controlling the host processor 2. The address latches 15 are of a tri-stated form and are only used when the host processor 2 has control of the bus. The address bits 3,2,1 are demultiplexed directly by the host processor 2 to avoid any latch delays during burst accesses. During bursts the upper address bits and the latched address bits remain static while address bits 3-1 count up. Thus, host processor 20 bursts are limited to 16 bytes. These bursts can occur in several combinations of byte and half-word accesses. All address decoding is based on the upper 4 address lines (aligned to 256 Mbyte boundaries), so one host processor burst cannot span multiple devices.

The multiplexed data bus of the host processor 2 is used to directly control the RTO processor 10, system RAM 5, system ROM 4, peripheral microcontroller 9 and the sound effects device 12. The colour and mixing unit 13, first memory card socket 6 and second memory card socket 7 are buffered to the processor bus by a buffer 16.

Arbitration of the processor bus 3 takes place between the host processor 2 and RTO processor 10. The host processor 2 masters the bus until RTO processor 10 is commanded (by the host processor 2) to begin operation. RTO processor 10 then takes control of the processor bus 3 and will notify the host processor 2 when it is finished. The host processor 2 has no mechanism to stop RTO processor 10 from obtaining the processor bus 3 except by halting the RTO processor 10 from operating. The RTO processor 10 will attempt to completely prepare an object list for display once started and may use the processor bus 3 continuously once it gets it (if the RTO processor 10 is rendering at the same time it may bottleneck internally and release the processor bus 3 until it is able use it again). Multiple object lists can be used to make up a frame, and this approach could be used to prevent the RTO processor 10 from holding too long a mastership of the processor bus 3.

The processor bus 3 has 4 external interrupts. Interrupt signal INT0 is the highest priority interrupt and is connected to the RTO processor 10 interrupt output. This interrupt is set by many events internal to RTO processor 10.

Interrupt signal INT1 is of second highest priority and forms a general purpose interrupt from the peripheral microcontroller 9 to the host processor 2. This interrupt is intended to maintain a communication protocol between the peripheral midocontroller 9 and the host processor 2, by separating interrupts relating to data being available from the other causes of interrupts. Timer events, serial communication, special keyboard keys, memory card insertion and removals can be communicated to the host processor 2 through this interrupt.

The host processor 2 communicates with the various other devices of the video processing system 1 by means of memory mapped I/O, a communication method well known to those in the art.

A bus control logic module 18 provides all necessary enable and select signals, read and write strobes, buffer controls and the ready signal for the host processor 2. This logic is active when the host processor 2 masters the bus and when RTO processor 10 masters the bus.

The peripheral microcontroller 9 and the host processor 2 communicate by means of placing information in a mail box 17. Interrupt signal INT2 is the third highest level interrupt and is set by the peripheral microcontroller 28 to indicate that data is available in the mail box 17 for collection.

Interrupt signal INT3 is the lowest priority interrupt and is set by the peripheral microcontroller 9 to indicate that it has taken the data from the mail box 17 which was written to it by the host processor 2. This allows the host processor 2 to know when it can send another byte of data to the mail box 17.

The system ROM 4 contains 512 kbytes of ROM which is generally provided by a single 256K×16 device. The system ROM 4 contains the controlling program for the video processing system 1 as well as various examples of animations, fonts, clip titles, and other data used in the video processing system 1. Both the host processor 2 and RTO processor can access the memory in the system ROM 4 and single and burst accesses are supported.

The system RAM 5 contains 256K bytes of RAM which consist of two 128K×8 devices. The system RAM 5 is used by the host processor 2 for the caching of graphic objects, the caching of performance critical code, and as a variable storage. Single and burst accesses are supported, as are byte writes. Preferably, the system RAM 5 is wired so that larger RAMs can be used when they become available.

The first memory card socket 6 and a second memory card socket 7 are provided for the insertion of standardized memory cards. Typically, these sockets are adapted to take cards conforming to both the IEDA and PCMCIA standards. JEIDA (Japanese Electronics Industry Development Association) and PCMCIA (PC Memory Card International Organization) have released substantially identical standards for the use of 68 pin interchangeable memory cards. Each memory card 19 can be typically be used as ROM devices incorporating object graphic data, but can also be either flash EPROM or static Ram with battery backup. Each memory card 19 is used to store libraries of graphics objects, animation edit lists, clip animations, clip rifles, fonts, animated characters, sound effects and/or special programs which replace or supplement all or pan of the programs within system ROM 4. Where static RAM cards are used, then these can also be used for storage of a user's animation sequences for later playback. Preferably each socket is capable of accommodating cards with increased storage capabilities as they become available.

The data bus 20 to the memory cards is preferably buffered by a buffer 16 from all other devices accessing the processor bus 3 except those of the colour and mixing unit 13. This is to ensure that the memory cards 19 do not interfere with the logic levels of the processor bus 3 at any stage. Although since a memory card 19 can be inserted or removed by the user at any time, some bus problems may be unavoidable. Short pins in each memory card socket can be used to provide interrupts a short time before the card is removed. This can allow some software time to prepare for removal. If the RTO processor 10 is mastering the processor bus 3 when a card 19 is removed, the recovery time for the host processor 2 software will be reduced by the maximum bus tenure of the RTO processor 10. The first memory card socket 6 and second memory card socket 7 are provided with short card detect bins which generate insertion and removal interrupts for the indication of the presence or otherwise of a memory card 19. The interrupts are sent to the peripheral microcontroller 9 (not shown) where they can be programmed for positive edge triggered interrupt (removal), negative edge triggered interrupt (insertion), or read to check for a crooked memory card 19. Detected interrupts can be relayed to the host processor 2 through the general interrupt. This interrupt will have to be qualified as to cause through communication via mail box 17.

In order to determine the nature of the memory card 19 inserted, an optional attribute memory may be read from the memory card 19. This attribute memory is only 8 bits wide and is read on the low data bus 20.

This allows the video processing system 1 to be used in conjunction with memory cards of different attributes and speeds. Preferably system software is provided to interrogate the memory cards and decide based on their speed and optional attribute memory, how the RTO processor 10 and the host processor 2 will best be able to safely access the memory cards.

Where SRAM type memory card devices with battery backups are supported, the memory card sockets 6, 7 are provided with battery condition signals that are connect to the peripheral microcontroller 9 (not shown) and indicate whether the battery is good or bad.

The RTO processor 10 is setup and controlled by the host processor 2 for the real-time rendering of object based graphic image and a full description of a specific example of the RTO processor 10 can be found in U.S. patent application Ser. No. 08/053,373, filed Apr. 28, 1993, claiming priority from Australian Patent Application No. PL2147, filed Apr. 29, 1992, by the same applicant, the disclosure of which has previously been incorporated by cross-reference.

The RTO processor 10, apart from interfacing with the processor bus 3, also interfaces with its own dedicated Quadratic Polynomial Fragments (QPF) memory 21 which is implemented as two SRAM devices 22, 23. The RTO processor 10 is provided with 256k bytes of 25ns local dedicated QPF memory 21 (two 64K×16 rams). SRAM 22 and SRAM 23 are always enabled, and the RTO processor 10 drives the read and write strobes directly.

Once setup and started, the RTO processor 10 reads lists of objects from the system ROM 4, the system RAM 5, or the memory cards 19 into its own local memory, prepares the objects, and then renders the objects, outputting an 8 bit data word in the form of RTO processor output level bus 24, for each pixel of the output display, which describes the level and effects desired for the highest visible object active at the pixel. Preferably, the display lists include object outline data which permit the calculation of graphic images in real time. An example of such data is quadratic polynomial fragments which are normally cached in the system RAM 5, but may be read directly from the system ROM 4 or from either of the memory cards.

After reading the display list, the RTO processor 10 scales and translates the QPF objects in each of the X and Y directions. This allows squash and stretch effects, as well as compensating for different pixel aspect ratios such as those found in PAL and NTSC television systems. After scaling and translation, the QPF's are calculated for interlaced displays, as the calculation of curve outlines must be different for odd and even fields of the video signal in order to obtain maximum vertical resolution. Next, QPF's which have been translated or scaled entirely off the screen are removed from the object list by culling. QPF's which are too small to be visible, are also culled. QPF's which cross the boundaries of the screen are also clipped. After initial processing, the QPF's are stored in the dedicated QPF memory 21. Once all the QPF's are stored in the dedicated QPF memory 21, they are sorted into line order and then pixel order in terms of the position of each of the first pixel in each QPF. Subsequently, the intersections of all QPF's with scan lines that they cross are calculated. This is performed in real-time without the use of a frame store. QPF's are not flattened into straight lines before intersection calculation, and accordingly curvature is preserved in the curves even at high magnification. After intersection calculation, the visible ordering of objects is determined and hidden surfaces are removed. Regions of colour are then filled by extending the priority levels for each QPF until the next intersection. Transparency and effect calculations are then performed in hardware and at real-time data rates.

In this manner, the RTO processor 10 outputs pixel data for display on raster displays in a synchronous manner and comprises only colour level data which is transferred via an 8-bit level RTO processor output level bus 24. The output pixel rate is 13.5 million pixels per second which is constant for both PAL and NTSC systems.

When the RTO processor 10 is a slave to the host processor 2, the host processor 2 is able to read the control registers of the RTO processor 10 in addition to reading the dedicated QPF memory 21. Access to control registers of the RTO processor 10 is performed through the usage of memory mapped I/O techniques. The base address for accessing the dedicated QPF memory 21 is programmed into the RTO processor 10 registers at start-up and is also set according to the host processor memory map table. The RTO processor 10 does not support burst access or byte writes to its registers or dedicated QPF memory 21.

When the RTO processor 10 is in control of the processor bus 3, the RTO processor 10 drives the demultiplexed address and data buses directly. As mentioned previously it requests use of the processor bus 3 by notification and subsequent grant from the host processor 2.

The RTO processor 10 has an interrupt out signal which is connected to and forms the host processor 2 highest priority interrupt (INT0). This interrupt is used to indicate many events including completion of operations and internal error events.

The RTO processor 10 is provided with inputs for pixel clocks, line and field synchronisation signals, and odd/even field signals. The pixel dock input to the RTO processor 10 is gen-locked onto the incoming video signal by means of a synchronization bus 25 driven from a clock generator 26. The line synchronisation, field synchronisation and line interlace signals are provided by a video decoder 27.

The video processing portion of the video processing system 1 includes video inputs 28. Incoming analogue composite video is input via an RCA connector and is then fed through a RFI ferrite bead. This signal is then terminated by a resistor to ground and AC coupled via a 1uF capacitor to the input of the video analogue to digitial converter 29. Luma (Y) and Chroma (C) components of S-Video signals come in via a 4 pin mini DIN connector. These are also passed through RFI ferrite beads before being terminated by a 75 ohm resistor to ground. These signals are also AC coupled by 1uF capacitors. The Luma component of the S-video input is forwarded to the analogue to digitial converter 29, whereas the chrominance component is forward to a second analogue to digital converter 30.

The analogue to digitial converter 29 is preferably implemented by a high speed 8-bit analogue to digital converter such as the Philips TDA8708 and is used for digitising the composite video or the Y-component of the S-Video. An input multiplexer which forms part of the analogue to digitial converter 29 is controlled by a programmable bit from the video decoder 27 which selects via a decoder to multiplexer control 31 either the composite video signal or the Y signal. The selected signal is then forwarded to an amplifier with clamp and gain control. Two signals, HSY and HCL are programmable signals that also come from the video decoder 27 via the decoder to multiplexer control 31 and indicate the sync and black portions of the input analogue video waveform respectively. If their active pulses are programmed to overlap each other, the analogue to digitial converter 29 will operate in configuration mode 1 where the gain of the video amplifier is adjusted so that a −128 is output at the sync level and 127 will be output for the peak level. This mode should only be used for weak incoming signals. When the active pulses of HSY and HCL are programmed so that they don't overlap each other (configuration mode 2), the gain will be adjusted so that a −128 will be output from the converter at bottom of the sync pulse and −64 will be output for the black level. Standard video signals should not exceed 85. The output from the amplifier is fed through an external low-pass filter with a −3dB point at about 6.2 MHz before the going into the analogue to digitial converter 29. The digital output is in 2's-complement format.

The analogue to digital converter 30 is preferably implemented by a Philips TDA8709 device and is used for digitising the chroma C-component of the S-Video input. A different analogue to digital converter 30 is required because the clamping and analogue to digital conversion functions are different for luminance and chrominance signals. An input multiplexer selects the C signal which is then passed through a video amplifier with gain and clamp control. The HCL of the video decoder 27 is used to activate the clamp circuit so that 128 is output as the clamped value for chroma input. The output from the amplifier is fed through an external low-pass filter with a −3dB point at about 6.2 MHz before the going into the convertor. The output is in 2's-complement format.

Both analogue to digital converters 29 and 30 are noise sensitive analogue circuits and both devices require passive components in a known manner.

Analogue to digital converters 29 and 30 output to the video decoder 27 which is preferably is implemented by a Philips SAA7151B Digital Multi-standard Decoder (DMSD) which is able to decode the digitised PAL/NTSC composite or S-Video data into 4:2:2 component Y, U, V formatted data in conformance with the CCIR Rec-601 standard. The video decoder 27 requires only a single 24.576 MHz clock from clock generator 26 for both PAL and NTSC signals and is able to 1 automatically detect the television standard of the incoming signal or it can be "forced" into a particular mode. The video decoder 27 can be programmed at start-up via its I²C interface by the peripheral microcontroller 9. The video decoder 27 utilizes many programmable software parameters which need to be initialised. These parameters include parameters for three main areas of the video decoder 27 Sync Processing, Luminance Processing and Chrominance Processing. There are also many software parameters to do with timing, and the characteristics of the digital filters. The programming of the video decoder 27 is complex but known to those skilled in the art. Decoding of the input data is performed solely in the digital domain and is fully described in SAA7199 Data Sheet available from Philips Corporation.

The Sync information is extracted from the video input data and 6 signals are generated by the video decoder 27 being VS, HS, ODD, HREF, HSY and HCL.

VS is the vertical sync information, HSY and HCL are programmable signals used by the analogue to digital converter 29 and analogue to digitial converter 29 to indicate sync and black portions of the incoming analogue video. HS is the horizontal sync and its leading edge is adjustable with respect to the leading edge of an incoming horizontal sync. This programmability allows horizontal adjustment of the final video output to compensate for any delays through the colour and mixing unit 13. HREF is always active at the first pixel on a line and goes inactive after the last pixel data on a line. The falling edge of this signal can be used by RTO processor 10 and colour and mixing unit 13 as a line sync signal.

The phase information of the incoming video is contained in 6.75 MHz triangular waveform (LFCO) which is fed to the clock generator 26 for generating line-locked 27 MHz and 13.5 MHz clocks.

The video decoder 27 has four 8 bit digital buses. As seen in FIG. 1A, a CVBS/Yin bus represents a digital Composite Video Baseband Signal input, or a Luminance input when the S-Video input of the video processing system 1 is used. Cin is a chroma input for S-Video. The signal has the two chroma components (U and V) quadrature modulated on the colour subcarrier. As the chroma sampling is line locked, while the colour subcarrier is not, the demodulation of these two colour components is involved.

Yout is the luminance output of the video decoder 27. It is sampled at 13.5 million samples per second and is connected directly to the portion of the colour and mixing unit 13 which processes the luminance of the combined colour image signal.

The video decoder 27 also has a UV output which represents the chrominance output. It contains multiplexed Cr and Cb signals, at 6.75 million samples per second each. The main difference between these and the Chrominance input is that the UV output is line-locked and time-division multiplexed, rather than quadrature modulated on an unlocked chroma subcarrier. Therefore, this signal is digital-compatible.

The clock generator 26 is preferably a Philips SAA7157 device and provides high speed phase-locked loops which generate line-locked video clocks. The clock generator 26 in conjunction with the video decoder 27 generates all the line locked video clocks for the video processing circuitry including both 27 MHz and 13.5 MHz clocks In addition to the video processing system 1 "power-on" reset pulse.

From the foregoing, it will be apparent that a video signal input to the video inputs 28 is divided into its colour components, and input to the colour and mixing unit 13

Figure 2:
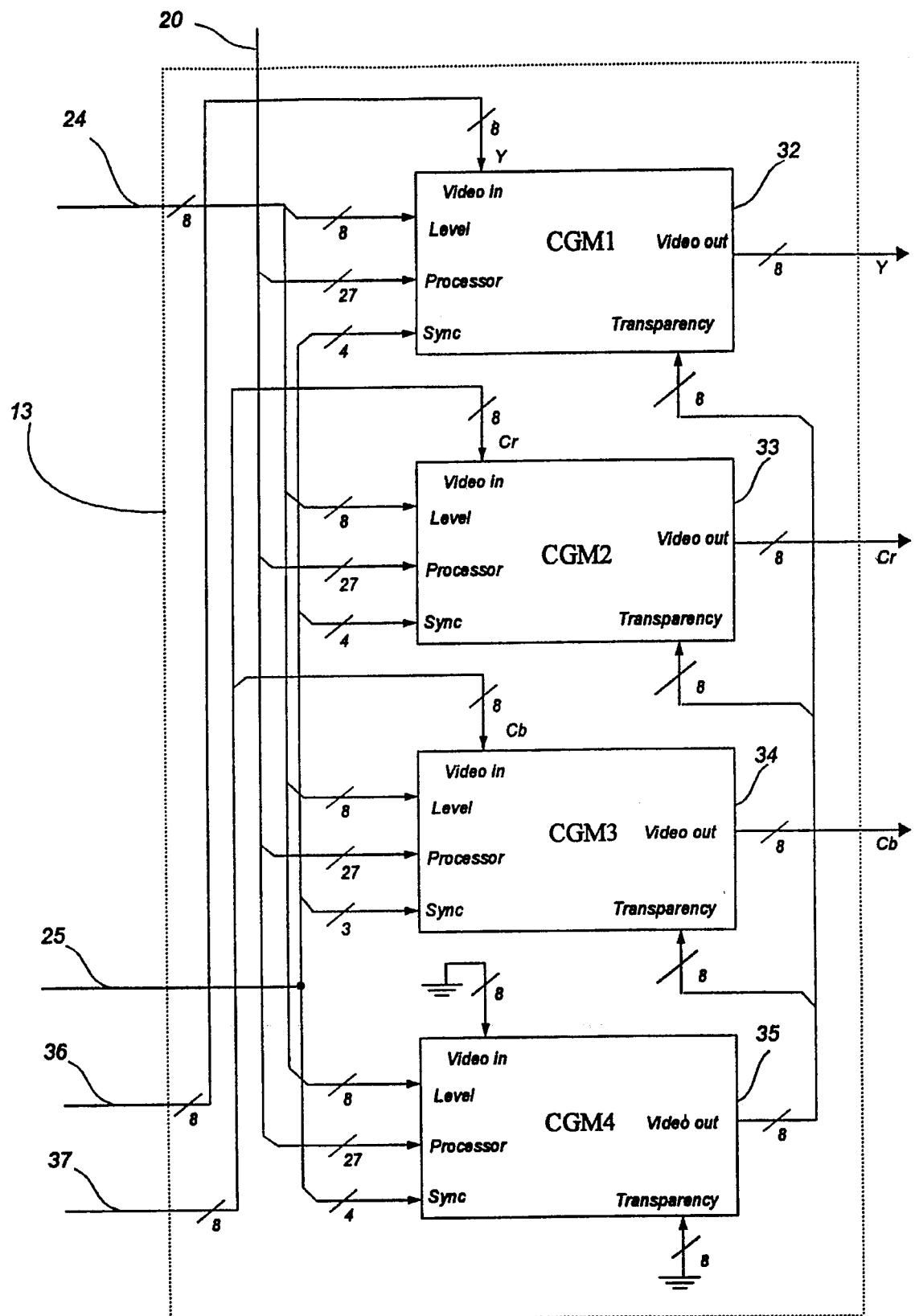
FIG. 2 is a schematic block diagram of the colour and mixing unit of FIG. 1.

Referring now to FIG. 2, there is shown the colour and mixing unit 13 in more detail. The colour and mixing unit 13 is configured using four colour generation and mixing (CGM) devices 32, 33, 34, 35. A full description of a specific example of a colour generating and mixing device corresponding to CGMs 32-35 can be found in U.S. patent application Ser. No. 08/053,231, filed Apr. 28, 1993, claiming priority from Australian Patent Application No. PL2152, Apr. 29, 1992 entitled "A Colour Generation and Mixing Device" by the same applicant, the disclosure of which is hereby incorporated by reference.

The CGMs 32-35 provides for video compositing, colour assignment, and blend functions which permit the calculation of the current colour of a pixel based upon the level of that pixel output from the RTO processor output level bus 24. In this particular embodiment, the CGM devices 32-35 operate to combine the RTO processor output level bus 24 with the digital data output from the video decoder 27.

Each of the CGM devices 32-35 include a number of input signals. Firstly each CGM connects to the data bus 20 which allows the host processor 2 to setup various colour tables which are used to form the output of each respective CGM.

Also each CGM device 32-35 includes a RTO processor output level bus 24 level input from the RTO processor 10, consisting of 6 bits of priority information and 2 bits of 'effects'.

Each of the CGM devices 32-35 includes a colour or video input, which for CGM4 35, is not used, but for each of the other CGM devices, is connected to the outputs 36, 37 of the video decoder 27.

Each of the CGM devices 32-35 also includes a mixing to transparency input, with CGM1 32, CGM2 33, CGM3 34 having their transparency inputs connected to CGM4 35. The video output of each CGM devices 32-34 provides a combination between the colour of the video input, controlled by the transparency input. Hence, CGM4 35 can be used as a control device to control the level of mixing of calculated level data output from the RTO processor 10, and specific colour video background data provided by the video decoder 27.

The operation of each of the CGM devices 52-55 is synchronised to the RTO processor 10 and the video decoder 27 via pixel clock, horizontal and vertical synchronization signals on the synchronization bus 25.

Because of the operation of the CGM4 35 which calculates the mixing transparency ratios for the other base colours, the processing outputs of each of the CGM devices 32-34 is delayed by several pixels to accommodate for the processing delay of the CGM4 35.

Furthermore, a multiple pixel delay exists from the output of the RTO processor 10, through the CGM devices 32-35 and a subsequently connected video encoder 38 to the actual video outputs 39 and 40. This delay is compensated using software incorporating a shift into the calculation into the horizontal position of all QPF objects in the RTO processor 10.

The CGM devices 50-52 output to the video encoder 38 which is configured as a digital video encoder which accepts 4:2:2 digital component video signals and converts them into analogue composite video and S-video signals. Such a device is the Philips SA7199 digital video encoder.

The video encoder 38 accepts sync signals from re-generated synchronisation information locked to the incoming video signal via the synchronization bus 25. These sync signals are generated by the video decoder 27 and the clock generator 26 and not by internal gen-lock facilities within the video encoder 38.

The video encoder 38 is programmed exclusively via its I²C interface from the peripheral microcontroller 9. The internal memory space of the video encoder 38 is divided into the colour look-up table (CLUT) and the control table. The address is written into the appropriate 8-bit address register for either the CLUT or control table and data is accessed via a CLUT or control table data port. The addresses are automatically incremented after each access to the data port. The exception to this is when accessing the CLUTs.

The CLUT can be used to range limit the digital video from the colour and mixing unit 13 so that they are legal CCIR-601 values if this process has not already been performed elsewhere.

The input video data stream from the colour and mixing unit 13 is in 4-2-2 Y, U, V data format clocked at 13.5 MHz. The video encoder 38 is setup to accept "Format3: customised 4-2-2 YUV" data according to the Philips Corporation's SAA7199 data sheet. The only difference between this format and standard 4-2-2 is that the U and V data are available concurrently on separate buses, thus allowing them to be processed by different CMG devices, with the values for the input video data being standard CCIR-601 values.

The position of the video data relative to horizontal sync on the analogue video outputs 39, composite video output 40, must be the same as that on the analogue video into video processing system 1. This is so that repeated passes of the same video through the video processing system 1 does not cause the picture to move horizontally. This can be achieved by appropriate positioning of the horizontal synchronisation from the video decoder 27 and programming the relevant parameters in the encoder. There are also many software parameters to do with Input Processing, Sync Processing, Clock control and Output Processing. The programming of the video encoder 38 is complex but known to those skilled in the art.

The analogue outputs of the video encoder 38 are passed through low pass filters 41 before forming analogue video output 39 and composite video output 40.

The peripheral microcontroller 9 is preferably implemented by a Philips 83C552 microcontroller which includes 8 kbytes of programmable ROM, 256 bytes of ram, 3 16-bit timer/counters, a 10 bit analog to digital converter with 8 multiplexed inputs, 40 bits of general purpose i/o, a I²C serial bus controller and a full duplex UART serial port. The peripheral microcontroller 9 is used to control the sound effects device 12, a keypad 42, a drawing pad 44, a serial data communication link 43, and to monitor the I²C bus 45 which is used to initialize and monitor the video decoder 27, video encoder 38 and the serial data communication link 43.

The peripheral microcontroller 9 communicates with the host processor 2 by means of the mail box 17 which consists of a 8-bit bi-directional latch. When the peripheral microcontroller 9 wishes to communicate with the host processor 2 is places the relevant data in the mail box 17 and notifies the host processor 2 by means of an interrupt that data is available. The communication from the host processor 2 to the peripheral microcontroller 9 occurs in a similar manner.

The sound effects device 12 generates sound effects for animated video sequences and mixes sound with incoming video. The video processing system 1 generates sound effects along with the animation sequences created. The sound effects take the form of digitally sampled data stored on the memory card 19 in a "library". The user of the video processing system 1 can select sound clips to be associated with animation sequences. When the animation sequence is to be replayed the host processor 2 reads the sampled sound data from the memory card 19 at the appropriate time and sends it to the sound effects device 12 for reproduction.

The sound effects are created by sound effects device 12 which is preferably implemented as by a SEIKO 5800A speech recording reproduction chip. The SEIKO 5800A is intended for use in self contained recording/playback circuits such as those used in a telephone answering machine. The recording features of the sound effects device 12 are not used, however when the SEIKO 5800A is used in a telephone answering machine, normally a sram memory device is connected to the SEIKO 5800A, and when it is commanded to record, it converts an incoming analog sound signal into digital Adaptive Differential Pulse Code Modulated (ADPCM) data and writes this to the sram memory device. It normally stops recording either when commanded to or when its address counter reaches a previously setup stop count. When commanded to playback it reads the (ADPCM) data from the sram memory device and converts this to an analog signal and sends this through an optional bandpass filter.

The video processing system 1 does not require the recording feature of the SEIKO 5800A. As sound data is to be moved from the host processor 2 and since we need to move data from the host processor 2 to the sound effects device 12 for reproduction, a FIFO queue 11 is used in place of the sram memory device of the sound effects device 12. The host processor 2 will write data into the FIFO queue 11, and the sound effects device 12 will read the data out and convert to an analog audio signal. The sound effects device 12 will be controlled by the peripheral microcontroller 9. The sound effects device 12 can be commanded to start reproduction and stop reproduction. An internal address counter in the sound effects device 12 increments whenever a byte of data is read for reproducing. Reproduction stops when this address counter matches a stop address register. This stop address register must be written by the peripheral microcontroller 9 before reproduction starts. The peripheral microcontroller 9 can also set the starting address of the address counter. The address is ignored in fetching data from the FIFO queue 11 but will still increment each time a read is performed.

Preferably the sound effects device 12 has some facility to maintain proper synchronization with a corresponding animation. The sound effects device 12 reproduces sound at a fixed rate with slight variations (0.5% accuracy over temperature and age). The sound effects device 12 can be programmed to sample and playback at 8 kHz or 4 kHz which provides for a shorter high-quality speed or longer low-quality speed. At the 8 kHz sample rate (high quality) the sound effects device 12 reads 4 kbytes/sec (each byte contains two 4 bit data samples). This is equal to 80 bytes/field for a frame rate of 25 Hz (PAL) and 66.7 bytes/field for a frame rate of 30 Hz (NTSC). The host processor 2 can read this many bytes from the a memory card 19 and write to the FIFO queue 11 based on the frame interrupt. The video output is genlocked to an incoming video source which can have some time-base error. Thus the number of bytes per frame of video can vary. Thus over time the sound effect and the video can lose sync.

Various synchronization schemes are possible. The simplest is to stop the sound effects device 12 and reset the FIFO queue 11. Preferably, only short sound clips are used so that this process can consequentially occur. If long generated sound needs to be kept in close sync with the video a more sophisticated scheme could check the address of the sound effects device 12 after a predetermined number of frames and allows the host processor 2 to adjust the number of bytes being written into the FIFO queue 11, being increased if the address is higher than expected or decreased if the address is lower than expected. To keep close synchronization with video each "frame" of sound will have to be chopped or padded by the host processor 2. For example, if the host processor 2 is required to send 80 bytes/e base error then 8 bytes will have to be removed or added. To keep the sound smooth some interpolation can be done between the cut points by the host processor 2. Because of the relatively long time between sample points (125 usec at 8 kHz) and the short time needed for stopping, checking address, resetting address, and restarting playback, there should be no noticeable effect on the sound output. If the sound should be terminated the host processor 2 should tell the peripheral microcontroller 9 before the FIFO queue 11 is empty so that the peripheral microcontroller 9 can stop the sound effects device 12 and flush the FIFO queue 11 with a reset.

The FIFO queue 11 is written to by the host processor 2. The low 8 bits of the processor bus 3 are used, the FIFO queue 11 is 1 kbyte deep and only 80 bytes per frame are needed. The FIFO queue 11 is reset by the peripheral microcontroller 9 before the first write to the FIFO queue 11.

The peripheral microcontroller 9 controls the sound effects device 12 and is able to write commands and read status and data from the sound effects device 12. The output of the FIFO queue 11 can also be read, through the sound effects device 12 when the peripheral microcontroller 9 is testing the FIFO queue 11. The normal SRAM memory interface of the sound effects device 12 is adapted to interface with the FIFO queue 11 and the software of the host processor 2 is designed to ensure that the sound effects device 12 does not try to access the FIFO queue 11 when it is empty.

The analogue output of the sound effects device 12 is mixed with a audio input signal 46 and amplified to produce a audio output signal 47.

The audio input signal 46 is also connected to an analogue to digital converter within the peripheral microcontroller 9 for processing to extract an approximate volume level. This level can be set to the host processor 2 to be used in the real time animation. For example, the level can be automatically used in the generation of a mouth shape in character animation. Mouth shape extraction does not require accuracy to give an adequate impression of talking characters. For example, dubbed movies have very little correlation between lips and sound but are still widely used. Digital processing of speech, in synchronisation with video generation can result in a significantly improved result.

The peripheral microcontroller 9 provides serial communications via the serial data communication link 43, which permits the linking of the video processing system 1, to other like systems, and to personal computers.

Figure 3:
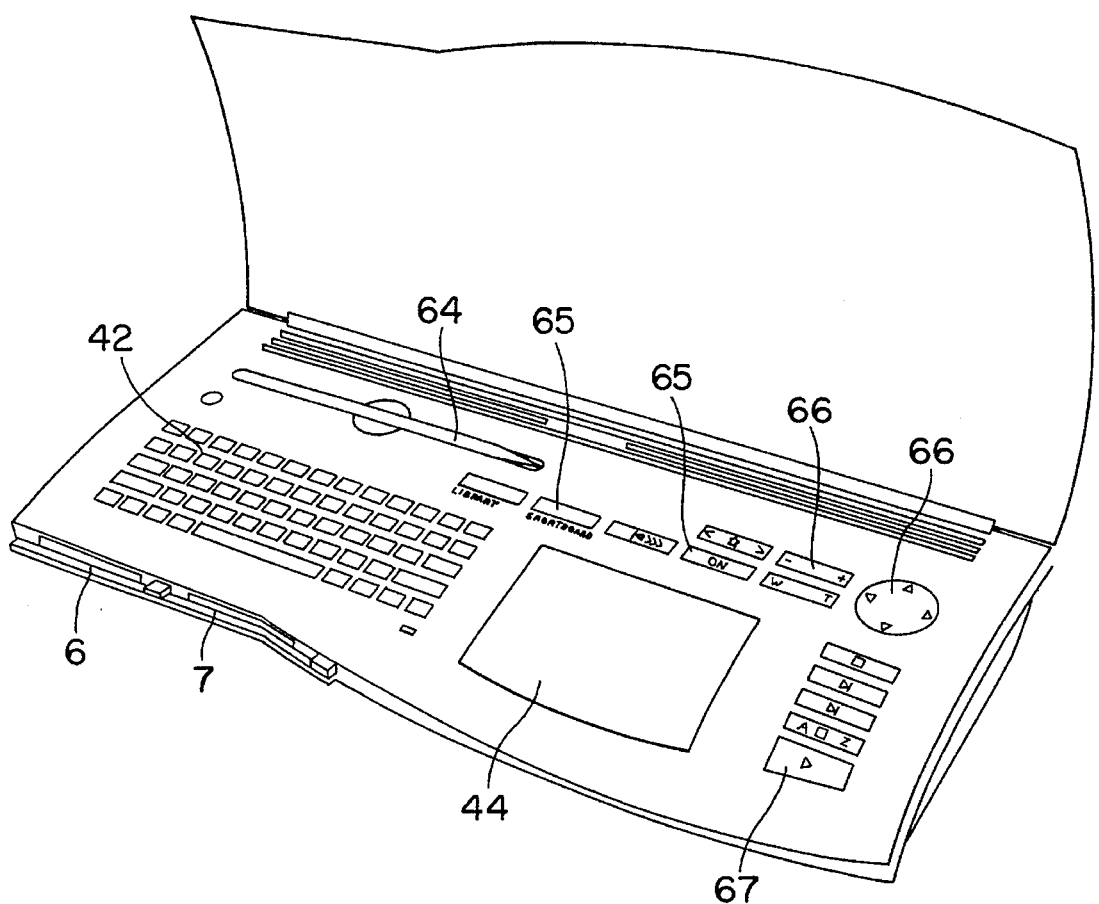
FIG. 3 is an illustration of an example design of the preferred embodiment.

Referring now to FIG. 3, there is shown an illustration of the video processing system 1 which includes a drawing pad 44 with corresponding digitizer pen 64 and a keypad 42, which includes an alphanumeric keyboard and a reset key, animation editing buttons 65, virtual camera control buttons 66, and animation control buttons 67. Additionally there is shown first memory card socket 6 and second memory card socket 7 for the insertion of memory cards.

The foregoing describes only one embodiment of the present invention. Use of other models and modifications, obvious to those skilled in the art, can be made thereto without departing from the scope of the invention.

We claim:

1. A video processor comprising:

a real-time object (RTO) processor for processing object-based graphic image data describing an object-based graphic image to form pixel-based image data representing the object-based graphic image, said RTO processor incorporating memory means for intermediate storage of only said object-based graphic image data and forming pixel-based image data directly from said object-based graphic image data in real-time without using a pixel-based image data storage means, thereby permitting real-time colour mixing and generation of the pixel-based image data with a first video signal so as to form a second video signal;

a video input means for receiving said first video signal;

at least one colour mixing and generation device arranged to combine said first video signal with said pixel-based image data formed by said RTO processor to provide said second video signal; and a video output means for outputting said second video signal.

2. A video processor system as claimed in claim 1 further comprising a host processor means for composing and editing said object-based graphic image data.

3. A video processor system as claimed in claim 2 further comprising a user controllable input means for selecting and editing said object-based graphic image data to create edited image data.

4. A video processor system as claimed in claim 3 wherein said input means further includes a plurality of memory storage housing means adapted to receive detachable memory storage devices containing said graphic object image data.

5. A video processor system as claimed in claim 4 wherein said detachable memory storage devices are in the form of non-volatile memory cards.

6. A video processor system as claimed in claim 4 wherein said memory storage devices include system code used in the operation of said video processor system.

7. A video processor system as claimed in claim 4 wherein said input means further comprises detection means for determination of the presence or absence of said detachable memory storage device.

8. A video processor system as claimed in claim 1 wherein said object-based graphic image data describes graphic objects using quadratic polynomial fragments.

9. A video processor system as claimed in claim 1 wherein said RTO processor further comprises edge determination means adapted to determine a current line object edge position data and a pixel colour determination means adapted to receive said current line object edge position data from said edge determination means and to produce a current pixel colour value for each displayable pixel of said object-based graphic image.

10. A video processor system as claimed in claim 9 wherein said current line edge position data includes object colour information and object transparency information.

11. A video processor system as claimed in claim 9 wherein said pixel colour determination means outputs to said colour mixing and generation device, said device comprising a colour mixing and generation means for each colour component of said second video signal.

12. A video processor system as claimed in claim 11 wherein said colour mixing and generation device is connected to said host processor and setup and control information of said device is alterable by said host processor.

13. A video processor system as claimed in claim 1 further comprising a control means with associated memory means for generating audio output signals in concert with said second video signal.

14. A video processor system as claimed in claim 13 wherein said audio output signals are generated in substantial synchronism with visual events depicted within said second video signal.

15. A video processor system as claimed in claim 13 further comprising a peripheral processor means adapted to operate said control means.

16. A video processor system as claimed in claim 13 wherein said memory means is a first-in first-out queue.

17. A video processor system comprising:

a host processor for compositing a list of graphic objects including graphic object-based data that together form an animated image;

a real-time object processor for receiving said list, said real-time object processor including a storage area for intermediate storage of said graphic object-based data and forming therefrom object level data in pixel-based rasterized format in real-time without the use of a pixel-based memory, thereby permitting real-time colour mixing and generation of the object level data with a first video signal so as to form a second video signal;

video input means for receiving a video input signal of a video image;

colouring means for receiving said object level data in real-time as said object level data is formed by said real-time object processor, for assigning image colour thereto and for combining same with said video input signal to produce a combined signal of said animated image and said video image; and video output means for outputting said combined signal in a video format for rasterized display.

18. A system as claimed in claim 17 further comprising memory means in which are stored said graphic objects, said memory means being accessible by said host processor for generation of said list.

19. A system as claimed in claim 18 wherein said memory means comprises user alterable memory devices connectable to said system by complementary connecting ports.

20. A system as claimed in claim 17 wherein said list comprises a list of individual curve portions for each said object, said real-time processor manipulating each said portion to produce said animated image.

21. A system as claimed in claim 20 wherein said portions describe curves by means of quadratic polynomial data that can be calculated by said real-time object processor to produce said animated image at real-time data rates suitable for real-time rasterised display.

22. A system as claimed in claim 17 wherein said video input means decodes said video input signal into a plurality of colour components which are input to said colouring means in which each said component is separately combined with said object level data to provide a pixel value for a corresponding combined colour component, said video output means encoding the corresponding combined colour components to provide said video output signal.

23. A system as claimed in claim 22 wherein colouring means comprises a plurality of colour generation and mixing (CGM) devices including at least one said device for each said colour component.

24. A system as claimed in claim 23 wherein said colouring means comprises a further CGM device which receives only said object level data and outputs to the other CGM devices a mixing level that controls the mixing of said video and animated images.

25. A system as claimed in claim 17 further comprising sound means for generating audio signals in substantial synchronism with selected portions of said video output signal.

26. A system as claimed in claim 25 wherein said sound means comprises an audio input means for receiving an audio input signal that can be processed in a sound effects generator which outputs said audio output signal.

27. A video processor comprising:

a real-time object processor (RTO) for processing object-based graphic image data describing an object-based graphic image to form pixel-based image data, said RTO processor processing the object-based graphic image data by receiving object outlines of an image which include object fragments intended for rasterized display, by sorting the object fragments into a rasterization sequence corresponding to a scan line, by storing a rasterization sequence, by reading out in real-time a previously stored rasterization sequence, by calculating object edges, each having a priority level in each display line, and by assigning pixel data values within each display line based on the priority level;

a video input for receiving a first video signal;

at least one colour mixing and generation device arranged to combine the first video signal with the pixel-based image data formed by the RTO processor to provide a second video signal; and a video output means for outputting the second video signal.

* * * * *

UNITED STATES PATENT AND TRADEMARK OFFICE
CERTIFICATE OF CORRECTION

PATENT NO. : 5,590,252
DATED : December 31, 1996
INVENTOR(S) : Kia Silverbrook

It is certified that error appears in the above-indentified patent and that said Letters Patent is hereby corrected as shown below:

```
    Column 2, line 28, delete "of".

Column 3, line 53, change "midocontroller 9" to
--microcontroller 9--.

Column 4, line 30, change "1EDA" to --JEIDA--.

Column 4, line 41, change "pan" to --part--.

Column 5, line 28, change "cross-reference" to
--reference--.

Column 6, line 40, change "dock" to --clock--.

Column 7, line 46, delete "1".
```

Signed and Sealed this

Thirtieth Day of September, 1997

Attest:

BRUCE LEHMAN

Attesting Officer    Commissioner of Patents and Trademarks